F. P. NICHOLS.
ROTARY ENGINE.
APPLICATION FILED JULY 14, 1908.
928,147.
Patented July 13, 1909.
2 SHEETS—SHEET 1.
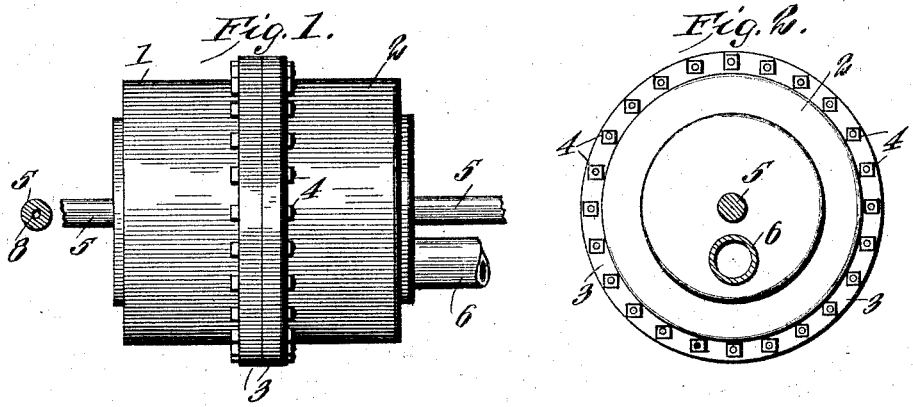
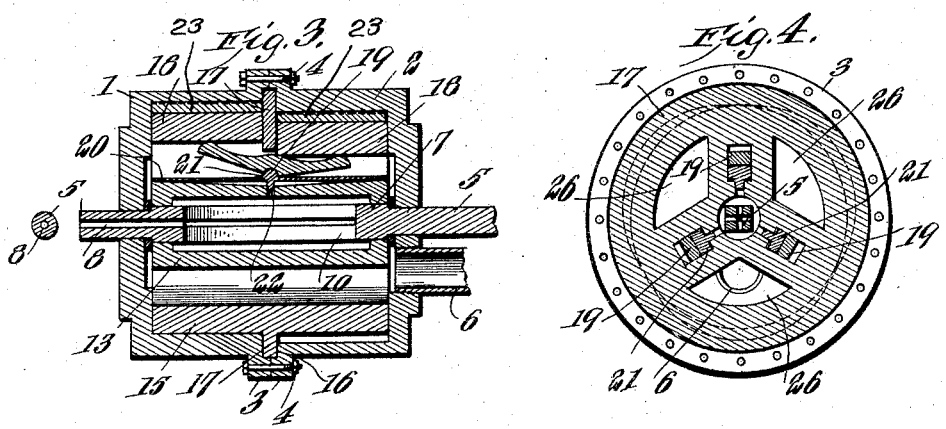
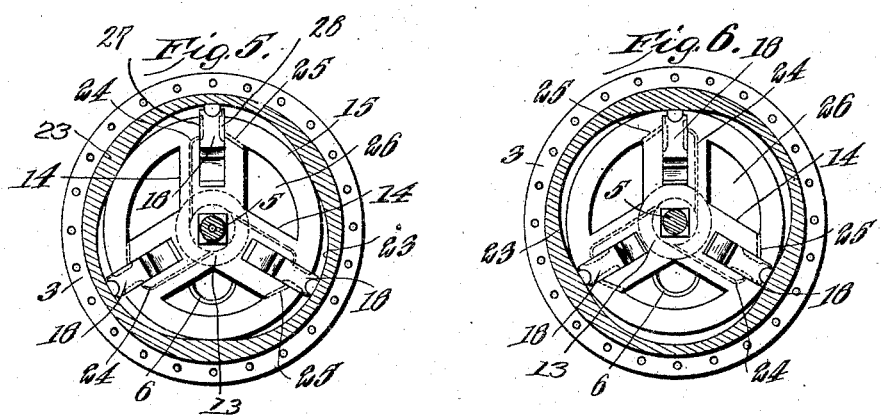
WITNESSES
INVENTOR
FRANKLIN P. NICHOLS
BY
ATTORNEYS

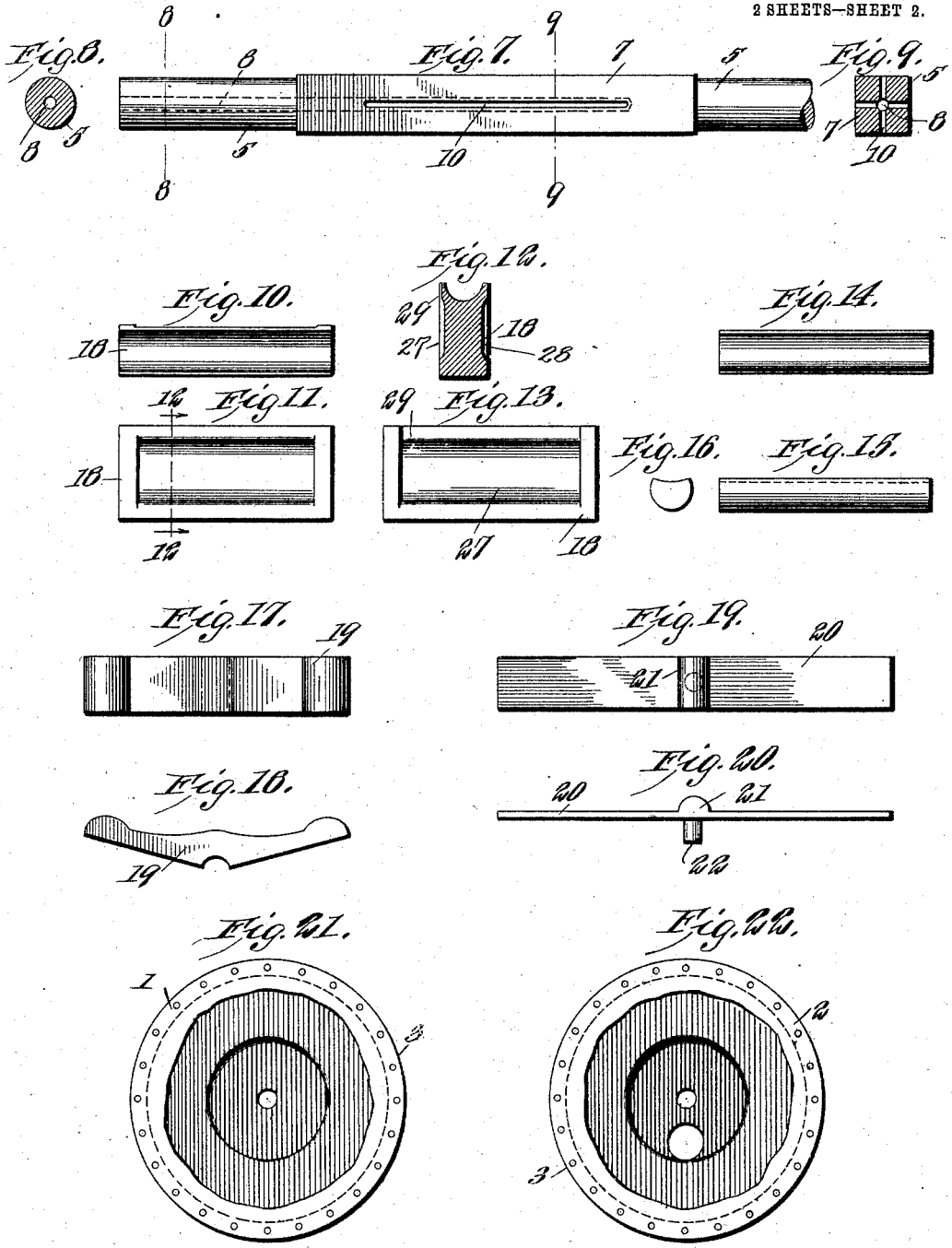

UNITED STATES PATENT OFFICE.

FRANKLIN P. NICHOLS, OF HOUSTON, TEXAS.

ROTARY ENGINE.

No. 928,147.        Specification of Letters Patent.        Patented July 13, 1909.

Application filed July 14, 1908. Serial No. 443,470.

*To all whom it may concern:*

Be it known that I, FRANKLIN P. NICHOLS, a citizen of the United States, and a resident of Houston, in the county of Harris and State of Texas, have invented certain new and useful Improvements in Rotary Engines, of which the following is a specification.

My invention is an improvement in rotary engines and consists in certain novel constructions and combinations of parts hereinafter described and claimed.

Referring to the drawings forming a part hereof Figure 1 is a side view of the engine, Fig. 2 is an end view. Fig. 3 is a central longitudinal section. Fig. 4 is a view with one of the casing sections removed, and with the rotor in section. Fig. 5 is a similar view showing the end of the rotor. Fig. 6 is a similar view looking from the other end. Fig. 7 is a plan view of the shaft. Fig. 8 is a section on the line 8—8 of Fig. 7. Fig. 9 is a section on the line 9—9 of such figure. Fig. 10 is a plan view of the slide valve. Fig. 11 is a side view of the same looking at one side thereof. Fig. 12 is a section on the line 12—12 of Fig. 11. Fig. 13 is a side view of the valve looking at the opposite side from Fig. 11. Fig. 14 is a top view of the adjustable valve head. Fig. 15 is a side view of the same. Fig. 16 is an end view. Fig. 17 is a plan view of the rocker. Fig. 18 is a side view. Fig. 19 is a plan view of the spring. Fig. 20 is a side view of the same. Fig. 21 is an end view of one of the jacket sections, and Fig. 22 is a similar view of the other section.

The present embodiment of my invention comprises a cylindrical jacket composed of sections, 1, 2, each of which is provided at its inner end with an annular flange 3, and bolts 4 traverse the flanges for securing the sections together. Each of the sections is provided with a bearing, in which is journaled a shaft 5, the shaft being coaxial with the cylinder, and the section 2 is provided with an exhaust 6. The shaft 5 is provided at its center with a square portion 7, and with a longitudinal opening 8 extending from one end of the shaft to the opposite end of the square portion, and the said square portion is provided with radial slits 10, the opening 8 acting as an inlet port for the motive fluid, which passes through the opening and through the slits 10. A cylindrical steam chamber 13 is journaled in the shaft 5, and radial arms 14 extend from the periphery of the cylindrical chamber, and the ends of the radial arms are connected with a cylindrical casing 15.

It will be observed from an inspection of Fig. 3 that at the junction of the two jacket halves, an annular groove 16 is formed which receives a flange 17 on the casing 15. The arms, three in number and the casing 15, are radially slotted as shown in Figs. 5 and 6, and in the slot on each side of the annular flange 17 is radially movable a piston blade 18, the blades being arranged in pairs, the members of the pairs being alined, the members of each pair resting on the opposite ends of a rocker 19, which is supported by a plate spring 20 resting on the cylindrical steam chest, and slightly bowed upward at its center. The spring is provided on its upper face with a boss 21, fitting within a groove or recess in the bottom of the rocker, and on its lower face with a lug 22 fitting in an opening in the steam chest.

The jacket is provided with a two part lining 23, one of the parts being arranged on each side of the flange 17, and each of said parts has its inner surface shaped to form a trefoil cam, as will be evident from an inspection of Figs. 5 and 6. The highest parts of each of the cams always engages the outer face of the casing 15, thus providing a series of three pressure chambers into which the motive fluid is admitted from the steam chest 13, by means of ports 24, and is permitted to exhaust through a port 25 to the space 26 between the steam chest 13, and the casing 15, the said spaces communicating with the exhaust 6.

From an inspection of Figs. 11, 12 and 13, it will be noticed that the sides of the piston blade are concave as at 27, 28, and on the side 27 the concavity is extended by a recess 29, to the top of the piston blade. The inlet port 24 opens into the concavity 28, the upper edge of the said concavity extending above the periphery of the casing when the piston blade is permitted to extend beyond the said periphery, into the pressure chamber, and the exhaust leads from the concavity 27, which is always in communication with the pressure chamber.

In operation the motive fluid being admitted through the hollow shaft, passing upwardly through the slots 10, and through the ports 24 to the pressure chambers, acting against the sides of the piston blades to rotate the rotor, which comprises the shaft, the casing and the piston blades.

It will be observed from an inspection of Figs. 3 and 4, that the projecting portions of the trefoil cam on one side of the annular flange are staggered with respect to the projections of the lining on the other side, so that when the piston blade on one side of the flange is moved inwardly by the cam lining, the piston blade on the other side will be moved outwardly by means of the rocker arm.

I claim:

1. An engine comprising a jacket provided at its center with an internal annular groove, and a lining at each side of the annular groove, said lining having spaced cam portions for the purpose set forth, the cam portions in one part of the lining being staggered with respect to the portions in the other part, a rotor rotatable in the lining, and comprising a central shaft, a spider secured thereto and having an annular flange moving in the groove, said spider having spaced piston blades arranged longitudinally of the shaft, and whose free edges move in contact with the lining, the blades being arranged in pairs, one member of each pair in one lining and the other in the other, and a rocker upon whose respective ends the members of the pair are mounted, said rotor shaft having a longitudinal passage, and radial slits leading from the passage and forming an inlet port, the jacket being provided with an exhaust port.

2. An engine comprising a jacket provided at its center with an internal annular groove, and a lining at each side of the annular groove, said lining having spaced cam portions for the purpose set forth, the cam portions in one part of the lining being staggered with respect to the portions in the other part, a rotor rotatable in the lining, and comprising a central shaft, a spider secured thereto and having an annular flange moving in the groove, said spider having spaced piston blades arranged longitudinally of the shaft, and whose free edges move in contact with the lining, the blades being arranged in pairs, one member of each pair in one lining and the other in the other, means for causing the members of a pair to move outward and inward in unison and in opposite directions, said rotor shaft having a longitudinal passage, and radial slits leading from the passage, and forming an inlet port, the jacket having an exhaust port.

FRANKLIN P. NICHOLS.

Witnesses:
J. E. BROWNE,
J. A. NIEDERMEIER.